US010609389B2

(12) United States Patent
Zheng et al.

(10) Patent No.: US 10,609,389 B2
(45) Date of Patent: Mar. 31, 2020

(54) IMAGE ENCODING METHOD, IMAGE DECODING METHOD, ENCODING DEVICE, AND DECODING DEVICE

(71) Applicant: HUAWEI TECHNOLOGIES CO., LTD., Shenzhen (CN)

(72) Inventors: Xiaozhen Zheng, Shenzhen (CN); Jianhua Zheng, Beijing (CN); Hai Chen, Shenzhen (CN); Meng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 178 days.

(21) Appl. No.: 15/836,827

(22) Filed: Dec. 9, 2017

(65) Prior Publication Data

US 2018/0103257 A1    Apr. 12, 2018

Related U.S. Application Data

(63) Continuation of application No. PCT/CN2015/081102, filed on Jun. 9, 2015.

(51) Int. Cl.
*G06T 5/00* (2006.01)
*H04N 19/176* (2014.01)
(Continued)

(52) U.S. Cl.
CPC ........... *H04N 19/176* (2014.11); *H04N 19/12* (2014.11); *H04N 19/124* (2014.11);
(Continued)

(58) Field of Classification Search
CPC .............. H04N 19/00–649; G06T 2207/20208
See application file for complete search history.

(56) References Cited

U.S. PATENT DOCUMENTS

2007/0223813 A1   9/2007 Segall et al.
2010/0119169 A1   5/2010 Haddad et al.
(Continued)

FOREIGN PATENT DOCUMENTS

CN   101779463 A   7/2010
CN   102685477 A   9/2012
(Continued)

OTHER PUBLICATIONS

ITU-T, High efficiency video coding, Recommendation ITU-T H.265, Apr. 30, 2015, 7 pages.
(Continued)

*Primary Examiner* — Brian Werner
(74) *Attorney, Agent, or Firm* — Kilpatrick Townsend & Stockton LLP

(57) ABSTRACT

Embodiments of the present disclosure provide an image encoding method, an image decoding method, an encoding device, and a decoding device. The method includes: determining a conversion function parameter of a current image block; determining a conversion function parameter of a neighboring image block corresponding to the current image block; determining, according to a correlation between the conversion function parameter of the current image block and the conversion function parameter of the neighboring image block, whether to perform merge encoding on the conversion function parameter of the current image block and the conversion function parameter of the neighboring image block, and determining a first indicator, where the first indicator is used to indicate whether to perform merge encoding on the conversion function parameter of the current image block and the conversion function parameter of the neighboring image block; and encoding the first indicator.

20 Claims, 3 Drawing Sheets

(51) Int. Cl.

| | |
|---|---|
| *H04N 19/593* | (2014.01) |
| *H04N 19/463* | (2014.01) |
| *H04N 19/85* | (2014.01) |
| *H04N 19/124* | (2014.01) |
| *H04N 19/12* | (2014.01) |
| *H04N 19/167* | (2014.01) |
| *H04N 19/46* | (2014.01) |

(52) U.S. Cl.
CPC ........... *H04N 19/167* (2014.11); *H04N 19/46* (2014.11); *H04N 19/463* (2014.11); *H04N 19/593* (2014.11); *H04N 19/85* (2014.11)

(56) References Cited

U.S. PATENT DOCUMENTS

| | | | |
|---|---|---|---|
| 2013/0258049 A1 | 10/2013 | Chong et al. | |
| 2013/0322518 A1 | 12/2013 | Terada et al. | |
| 2015/0016506 A1 | 1/2015 | Fu et al. | |
| 2015/0229932 A1 | 8/2015 | Sato | |
| 2016/0316207 A1* | 10/2016 | Minoo | H04N 19/136 |
| 2016/0360213 A1* | 12/2016 | Lee | H04N 19/186 |
| 2019/0158871 A1* | 5/2019 | Schwarz | H04N 19/50 |

FOREIGN PATENT DOCUMENTS

| | | |
|---|---|---|
| CN | 103518375 A | 1/2014 |
| CN | 103636221 A | 3/2014 |
| JP | 2007257641 A | 10/2007 |
| JP | 2009207114 A | 9/2009 |
| JP | 2015515810 A | 5/2015 |
| WO | 2012097376 A1 | 7/2012 |
| WO | 2012122425 A1 | 9/2012 |
| WO | 2014204865 A1 | 12/2014 |
| WO | 2015005025 A1 | 1/2015 |

OTHER PUBLICATIONS

ITU-T H.264 Series H: Audiovisual and Multimedia Systems Infrastructure of audiovisual services—Coding of moving video Advanced video coding for generic audiovisual services. Telecommunication Standardization Sector of ITU, Feb. 2014, 790 pages.

High Dynamic Range Electro-Optical Transfer Function of Mastering Reference Displays, SMPTE Standard, SMPTE ST 2084:2014, 14 pages.

Itu-T H.265(Apr. 2013), Series H: Audiovisual and Multimedia Systems, Infrastructure of audiovisual services—Coding of moving video, High efficiency video coding, (Apr. 2013), total 317 pages.

ISO/IEC 23008-2:2013, "Information technology—High efficiency coding and media delivery in heterogeneous.environments—Part 2: High efficiency video coding", Dec. 2013, total 13 pages.

\* cited by examiner

IMAGE ENCODING METHOD, IMAGE DECODING METHOD, ENCODING DEVICE, AND DECODING DEVICE

CROSS-REFERENCE TO RELATED APPLICATIONS

This application is a continuation of International Application No. PCT/CN2015/081102, filed on Jun. 9, 2015, which is incorporated herein by reference in their entirety.

TECHNICAL FIELD

Embodiments of the present disclosure relate to the field of information technologies, and more specifically, to an image encoding method, an image decoding method, an encoding device, and a decoding device.

BACKGROUND

In recent years, high dynamic range (HDR for short) technologies are becoming mature and widely applied to image and video encoding and decoding technologies. Compared with an ordinary image, an HDR image can provide a wide dynamic range and more image details, and can better reflect a visual effect in a real environment. In an HDR image, to record more image luminance information, instead of a conventional integer-bit (N-bit) image representation format, a 16-bit or 32-bit floating-point number is used to record luminance information. Because the image representation format is different from the conventional integer-bit representation manner, particular preprocessing and post-processing need to be performed during HDR video encoding.

Because an HDR video finally needs to be quantized as integer-bit data for subsequent encoding, considering that a dynamic range of the HDR video is far greater than that of the integer-bit data, a great loss may be caused to information about an HDR source if linear quantification is directly performed. Therefore, an HDR video represented by using a floating-point number needs to be converted by using a conversion function. A form for such conversion may be nonlinear conversion, to protect luminance sections requiring special protection, or may be conversion in another form, for example, tone mapping (English: Tone Mapping).

FIG. 1 is a typical flowchart of preprocessing and encoding of an HDR video.

As shown in FIG. 1, first, an HDR video represented by using a floating-point number is processed by using a conversion function, to obtain R'G'B' data. Then, the R'G'B' data is converted to an image of a 4:4:4 YCbCr format, and then the floating-point number is converted to an integer by a quantization module. To minimize a loss of an HDR source, an HDR source is usually quantized as fixed-length-bit integer data, for example, 10-bit integer data. Finally, the 4:4:4 YCbCr data is converted to 4:2:0 YCbCr data to complete the preprocessing process. After the preprocessing, the floating-point-number HDR data has been converted to the integer-data (for example, 10-bit) 4:2:0 YCbCr data applicable to conventional video encoding. In this case, the 4:2:0 YCbCr data is then encoded by an encoder that uses a conventional video encoding technology, to obtain an encoded bitstream. The fixed-length-bit integer may be 16 bits, 12 bits, 10 bits, or 8 bits. For simplicity, 10 bits are used as an example below for description.

FIG. 2 is a flowchart of corresponding decoding and postprocessing.

As shown in FIG. 2, first, on a decoder side, an encoded bitstream is decoded by a decoder that uses a conventional video decoding technology, to obtain reconstructed 4:2:0 10-bit YCbCr data. Then, 10-bit reverse quantization is performed on the 4:2:0 10-bit YCbCr data to obtain data of a 16-bit or 32-bit floating-point number format. Afterward, the data of the 16-bit or 32-bit floating-point number format is converted to data of an R'G'B' format. Finally, the data of the R'G'B' format is processed by using a reverse conversion function to obtain an HDR image or video.

A conversion function used in an existing HDR encoding technology is a global function. That is, a video is nonlinearly processed by using a uniform conversion function. Because a video includes images falling within different luminance ranges, and luminance information ranges of different areas of an image are not the same, using a single global conversion function cannot consider luminance characteristics of all images in the video and all areas in the images, affecting effects of HDR video encoding and decoding. In addition, currently, in an HDR video encoding and decoding method, to minimize distortion of an HDR signal source, a 10-bit integer encoding and decoding method is used. Design costs and complexity of a 10-bit integer codec are both greater than those of an 8-bit integer encoding and decoding method, increasing implementation costs of an HDR video codec.

SUMMARY

Embodiments of the present disclosure provide an image encoding method, an image decoding method, an encoding device, and a decoding device, so as to reduce bitstream overheads, and improve encoding efficiency.

According to a first aspect, an embodiment of the present disclosure provides an image encoding method, and the method includes: determining a conversion function parameter of a current image block; determining a conversion function parameter of a neighboring image block corresponding to the current image block; determining, according to a correlation between the conversion function parameter of the current image block and the conversion function parameter of the neighboring image block, whether to perform merge encoding on the conversion function parameter of the current image block and the conversion function parameter of the neighboring image block, and determining a first indicator, where the first indicator is used to indicate whether to perform merge encoding on the conversion function parameter of the current image block and the conversion function parameter of the neighboring image block; and encoding the first indicator.

With reference to the first aspect, in a first possible implementation of the first aspect, each of the conversion function parameters is M parameters, and M is a positive integer greater than or equal to 1; or each of the conversion function parameters is an index value of a conversion function.

With reference to the first aspect or the first possible implementation of the first aspect, in a second possible implementation of the first aspect, the determining, according to a correlation between the conversion function parameter of the current image block and the conversion function parameter of the neighboring image block, whether to perform merge encoding on the conversion function parameter of the current image block and the conversion function parameter of the neighboring image block includes: if it is determined that the conversion function parameter of the current image block and the conversion function parameter of the neighboring image block are completely the same, determining to perform merge encoding on the conversion function parameter of the current image block and the conversion function parameter of the neighboring image block; or if it is determined that the conversion function parameter of the current image block and the conversion function parameter of the neighboring image block are not completely the same, determining not to perform merge encoding on the conversion function parameter of the current image block and the conversion function parameter of the neighboring image block; and when it is determined not to perform merge encoding on the conversion function parameter of the current image block and the conversion function parameter of the neighboring image block, the method further includes: determining first encoding information, where the first encoding information is encoding information for encoding the conversion function parameter of the current image block.

With reference to the first possible implementation of the first aspect, in a third possible implementation of the first aspect, when each of the conversion function parameters is the M parameters, the determining, according to a correlation between the conversion function parameter of the current image block and the conversion function parameter of the neighboring image block, whether to perform merge encoding on the conversion function parameter of the current image block and the conversion function parameter of the neighboring image block includes: if at least one parameter in the conversion function parameter of the current image block is the same as a corresponding parameter in the conversion function parameter of the neighboring image block, determining to perform merge encoding on the conversion function parameter of the current image block and the conversion function parameter of the neighboring image block; or if no parameter in the conversion function parameter of the current image block is the same as a corresponding parameter in the conversion function parameter of the neighboring image block, determining not to perform merge encoding on the conversion function parameter of the current image block and the conversion function parameter of the neighboring image block; and when it is determined not to perform merge encoding on the conversion function parameter of the current image block and the conversion function parameter of the neighboring image block, the method further includes: determining first encoding information, where the first encoding information is encoding information for encoding the conversion function parameter of the current image block.

With reference to the third possible implementation of the first aspect, in a fourth possible implementation of the first aspect, when it is determined to perform merge encoding on the conversion function parameter of the current image block and the conversion function parameter of the neighboring image block, the method further includes: determining M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, ... , M; encoding the M encoding flag bits; determining second encoding information, where the second encoding information is encoding information for encoding a parameter in the conversion function parameter of the current image block and a corresponding parameter in the conversion function parameter of the neighboring image block that are different from each other, and the conversion function parameter of the current image block includes a parameter in the conversion function parameter of the current image block that is the same as a corresponding parameter in the conversion function parameter of the neighboring image block, and the parameter in the conversion function parameter of the current image block that is different from the corresponding parameter in the conversion function parameter of the neighboring image block; and encoding the second encoding information.

With reference to the third possible implementation of the first aspect, in a fifth possible implementation of the first aspect, when it is determined to perform merge encoding on the conversion function parameter of the current image block and the conversion function parameter of the neighboring image block, the method further includes: determining M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, ... , M; and encoding the M encoding flag bits, where the M parameters in the conversion function parameter of the current image block are the same as the M parameters in the conversion function parameter of the neighboring image block.

With reference to any one of the first aspect or the foregoing possible implementations of the first aspect, in a sixth possible implementation of the first aspect, the determining a conversion function parameter of a neighboring image block corresponding to the current image block includes: determining the neighboring image block in multiple candidate neighboring image blocks and determining the conversion function parameter of the neighboring image block; and the method further includes: determining a position of the neighboring image block and determining a second indicator, where the second indicator is used to indicate the position of the neighboring image block; and encoding the second indicator.

With reference to any one of the first aspect or the foregoing possible implementations of the first aspect, in a seventh possible implementation of the first aspect, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

According to a second aspect, an embodiment of the present disclosure provides an image decoding method, and the method includes: obtaining a first indicator from a bitstream, where the first indicator is used to indicate whether to perform combined decoding on a conversion function parameter of a current image block and a conversion function parameter of a neighboring image block; and obtaining the conversion function parameter of the current image block according to the first indicator.

With reference to the second aspect, in a first possible implementation of the second aspect, each of the conversion function parameters is M parameters, and M is a positive integer greater than or equal to 1; or each of the conversion function parameters is an index value of a conversion function.

With reference to the second aspect or the first possible implementation of the second aspect, in a second possible implementation of the second aspect, the obtaining the conversion function parameter of the current image block according to the first indicator includes: when it is determined that the first indicator is used to instruct to perform combined decoding on the conversion function parameter of the current image block and the conversion function parameter of the neighboring image block, determining that the conversion function parameter of the current image block is the same as the conversion function parameter of the neighboring image block.

With reference to the first possible implementation of the second aspect, in a third possible implementation of the second aspect, when each of the conversion function parameters is the M parameters, the obtaining the conversion function parameter of the current image block according to the first indicator includes: when it is determined that the first indicator is used to instruct to perform combined decoding on the conversion function parameter of the current image block and the conversion function parameter of the neighboring image block, obtaining M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, ... , M; determining, according to the M decoding flag bits, a parameter in the conversion function parameter of the current image block and a corresponding parameter in the conversion function parameter of the neighboring image block that are the same; obtaining second decoding information, where the second decoding information is decoding information for decoding a parameter in the conversion function parameter of the current image block and a corresponding parameter in the conversion function parameter of the neighboring image block that are different from each other; and decoding the second decoding information according to the M decoding flag bits, to determine the parameter in the conversion function parameter of the current image block and the corresponding parameter in the conversion function parameter of the neighboring image block that are different from each other, where the conversion function parameter of the current image block includes the parameter in the conversion function parameter of the current image block that is the same as the corresponding parameter in the conversion function parameter of the neighboring image block, and the parameter in the conversion function parameter of the current image block that is different from the corresponding parameter in the conversion function parameter of the neighboring image block.

With reference to the first possible implementation of the second aspect, in a fourth possible implementation of the second aspect, when each of the conversion function parameters is the M parameters, the obtaining the conversion function parameter of the current image block according to the first indicator includes: when it is determined that the first indicator is used to instruct to perform combined decoding on the conversion function parameter of the current image block and the conversion function parameter of the neighboring image block, obtaining M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, ... , M; and determining, according to the M decoding flag bits, a parameter in the conversion function parameter of the current image block and a corresponding parameter in the conversion function parameter of the neighboring image block that are the same, where the M parameters in the conversion function parameter of the current image block are the same as the M parameters in the conversion function parameter of the neighboring image block.

With reference to the second aspect, in a fifth possible implementation of the second aspect, the obtaining the conversion function parameter of the current image block according to the first indicator includes: when it is determined that the first indicator is used to instruct not to perform combined decoding on the conversion function parameter of the current image block and the conversion function parameter of the neighboring image block, obtaining first decoding information, where the first decoding information is decoding information for decoding the conversion function parameter of the current image block; and decoding the first decoding information to obtain the conversion function parameter of the current image block.

With reference to any one of the second aspect or the foregoing possible implementations of the second aspect, in a sixth possible implementation of the second aspect, before the obtaining the conversion function parameter of the current image block according to the first indicator, the method further includes: obtaining a second indicator; and determining the neighboring image block according to the second indicator.

With reference to any one of the second aspect or the foregoing possible implementations of the second aspect, in a seventh possible implementation of the second aspect, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

According to a third aspect, an embodiment of the present disclosure provides an encoding device, and the device includes: a determining unit, configured to determine a conversion function parameter of a current image block, where the determining unit is further configured to determine a conversion function parameter of a neighboring image block corresponding to the current image block; and the determining unit is further configured to: determine, according to a correlation between the conversion function parameter of the current image block and the conversion function parameter of the neighboring image block, whether to perform merge encoding on the conversion function parameter of the current image block and the conversion function parameter of the neighboring image block, and determine a first indicator, where the first indicator is used to indicate whether to perform merge encoding on the conversion function parameter of the current image block and the conversion function parameter of the neighboring image block; and an encoding unit, configured to encode the first indicator.

With reference to the third aspect, in a first possible implementation of the third aspect, each of the conversion function parameters is M parameters, and M is a positive integer greater than or equal to 1; or each of the conversion function parameters is an index value of a conversion function.

With reference to the third aspect or the first possible implementation of the third aspect, in a second possible implementation of the third aspect, the determining unit is specifically configured to: if determining that all parameters in the conversion function parameter of the current image block and all parameters in the conversion function parameter of the neighboring image block are the same, determine to perform merge encoding on the conversion function parameter of the current image block and the conversion function parameter of the neighboring image block; or if determining that at least one parameter in the conversion function parameter of the current image block is different from a corresponding parameter in the conversion function parameter of the neighboring image block, determine not to perform merge encoding on the conversion function parameter of the current image block and the conversion function parameter of the neighboring image block; and the encoding unit is further configured to: when the determining unit determines not to perform merge encoding on the conversion function parameter of the current image block and the conversion function parameter of the neighboring image block, determine first encoding information, where the first encoding information is encoding information for encoding the conversion function parameter of the current image block.

With reference to the first possible implementation of the third aspect, in a third possible implementation of the third aspect, when each of the conversion function parameters is the M parameters, the determining unit is specifically configured to: if at least one parameter in the conversion function parameter of the current image block is the same as a corresponding parameter in the conversion function parameter of the neighboring image block, determine to perform merge encoding on the conversion function parameter of the current image block and the conversion function parameter of the neighboring image block; or if no parameter in the conversion function parameter of the current image block is the same as a corresponding parameter in the conversion function parameter of the neighboring image block, determine not to perform merge encoding on the conversion function parameter of the current image block and the conversion function parameter of the neighboring image block; and the encoding unit is further configured to: when the determining unit determines not to perform merge encoding on the conversion function parameter of the current image block and the conversion function parameter of the neighboring image block, determine first encoding information, where the first encoding information is encoding information for encoding the conversion function parameter of the current image block.

With reference to the third possible implementation of the third aspect, in a fourth possible implementation of the third aspect, the determining unit is further configured to determine M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M; the encoding unit is further configured to encode the M encoding flag bits; the determining unit is further configured to determine second encoding information, where the second encoding information is encoding information for encoding a parameter in the conversion function parameter of the current image block and a corresponding parameter in the conversion function parameter of the neighboring image block that are different from each other, and the conversion function parameter of the current image block includes a parameter in the conversion function parameter of the current image block that is the same as a corresponding parameter in the conversion function parameter of the neighboring image block, and the parameter in the conversion function parameter of the current image block that is different from the corresponding parameter in the conversion function parameter of the neighboring image block; and the encoding unit is further configured to encode the second encoding information.

With reference to the third possible implementation of the third aspect, in a fifth possible implementation of the third aspect, the determining unit is further configured to determine M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M; and the encoding unit is further configured to encode the M encoding flag bits, where the M parameters in the conversion function parameter of the current image block are the same as the M parameters in the conversion function parameter of the neighboring image block.

With reference to any one of the third aspect or the foregoing possible implementations of the third aspect, in a sixth possible implementation of the third aspect, the determining unit is further configured to: determine the neighboring image block in multiple candidate neighboring image blocks and determine the conversion function parameter of the neighboring image block; and determine a position of the neighboring image block and determine a second indicator, where the second indicator is used to indicate the position of the neighboring image block; and the encoding unit is further configured to encode the second indicator.

With reference to any one of the third aspect or the foregoing possible implementations of the third aspect, in a seventh possible implementation of the third aspect, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

According to a fourth aspect, an embodiment of the present disclosure provides a decoding device, and the device includes: a first obtaining unit, configured to obtain a first indicator from a bitstream, where the first indicator is used to indicate whether to perform combined decoding on a conversion function parameter of a current image block and a conversion function parameter of a neighboring image block; and a second obtaining unit, configured to obtain the conversion function parameter of the current image block according to the first indicator.

With reference to the fourth aspect, in a first possible implementation of the fourth aspect, each of the conversion function parameters is M parameters, and M is a positive integer greater than or equal to 1; or each of the conversion function parameters is an index value of a conversion function.

With reference to the fourth aspect or the first possible implementation of the fourth aspect, in a second possible implementation of the fourth aspect, the second obtaining unit is specifically configured to: when it is determined that the first indicator is used to instruct to perform combined decoding on the conversion function parameter of the current image block and the conversion function parameter of the neighboring image block, determine that the conversion function parameter of the current image block is the same as the conversion function parameter of the neighboring image block.

With reference to the first possible implementation of the fourth aspect, in a third possible implementation of the fourth aspect, when each of the conversion function parameters is the M parameters, the second obtaining unit is specifically configured to: when it is determined that the first indicator is used to instruct to perform combined decoding on the conversion function parameter of the current image block and the conversion function parameter of the neighboring image block, obtain M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, . . . , M; determine, according to the M decoding flag bits, a parameter in the conversion function parameter of the current image block and a corresponding parameter in the conversion function parameter of the neighboring image block that are the same; obtain second decoding information, where the second decoding information is decoding information for decoding a parameter in the conversion function parameter of the current image block and a corresponding parameter in the conversion function parameter of the neighboring image block that are different from each other, and the conversion function parameter of the current image block includes the parameter in the conversion function parameter of the current image block that is the same as the corresponding parameter in the conversion function parameter of the neighboring image block, and the parameter in the conversion function parameter of the current image block that is different from the corresponding parameter in the conversion function parameter of the neighboring image block; and decode the second decoding information according to the M decoding flag bits, to determine the parameter in the conversion function parameter of the current image block and the corresponding parameter in the conversion function parameter of the neighboring image block that are different from each other.

With reference to the first possible implementation of the fourth aspect, in a fourth possible implementation of the fourth aspect, when each of the conversion function parameters is the M parameters, the second obtaining unit is specifically configured to: when it is determined that the first indicator is used to instruct to perform combined decoding on the conversion function parameter of the current image block and the conversion function parameter of the neighboring image block, obtain M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, . . . , M; and determine, according to the M decoding flag bits, a parameter in the conversion function parameter of the current image block and a corresponding parameter in the conversion function parameter of the neighboring image block that are the same, where the M parameters in the conversion function parameter of the current image block are the same as the M parameters in the conversion function parameter of the neighboring image block.

With reference to the fourth aspect or the first possible implementation of the fourth aspect, in a fifth possible implementation of the fourth aspect, the second obtaining unit is specifically configured to: when it is determined that the first indicator is used to instruct not to perform combined decoding on the conversion function parameter of the current image block and the conversion function parameter of the neighboring image block, obtain first decoding information, where the first decoding information is decoding information for decoding the conversion function parameter of the current image block; and decode the first decoding information to obtain the conversion function parameter of the current image block.

With reference to any one of the fourth aspect or the foregoing possible implementations of the fourth aspect, in a sixth possible implementation of the fourth aspect, the device further includes: a third obtaining unit, configured to: obtain a second indicator, and determine the neighboring image block according to the second indicator.

With reference to any one of the fourth aspect or the foregoing possible implementations of the fourth aspect, in a seventh possible implementation of the fourth aspect, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

In the foregoing technical solutions, merge encoding is performed on the conversion function parameters of the current image block and the neighboring image block, so that bitstream overheads can be reduced, and encoding efficiency can be improved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
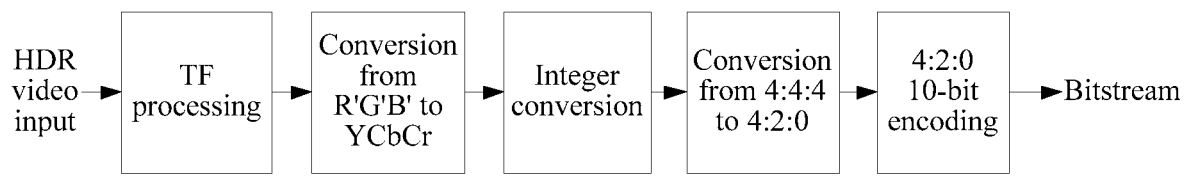
FIG. 1 is a typical flowchart of preprocessing and encoding of an HDR video.
Figure 2:
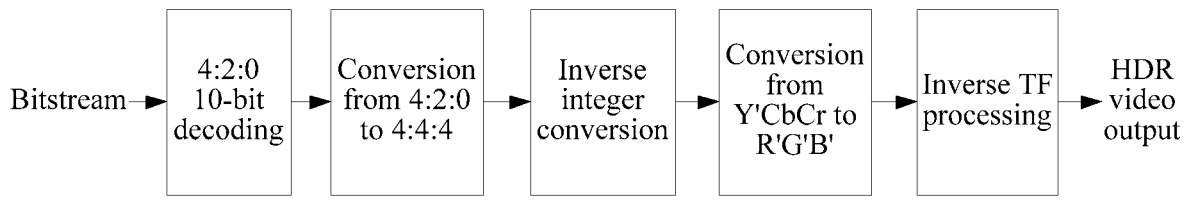
FIG. 2 is a flowchart of corresponding decoding and postprocessing.
Figure 3:
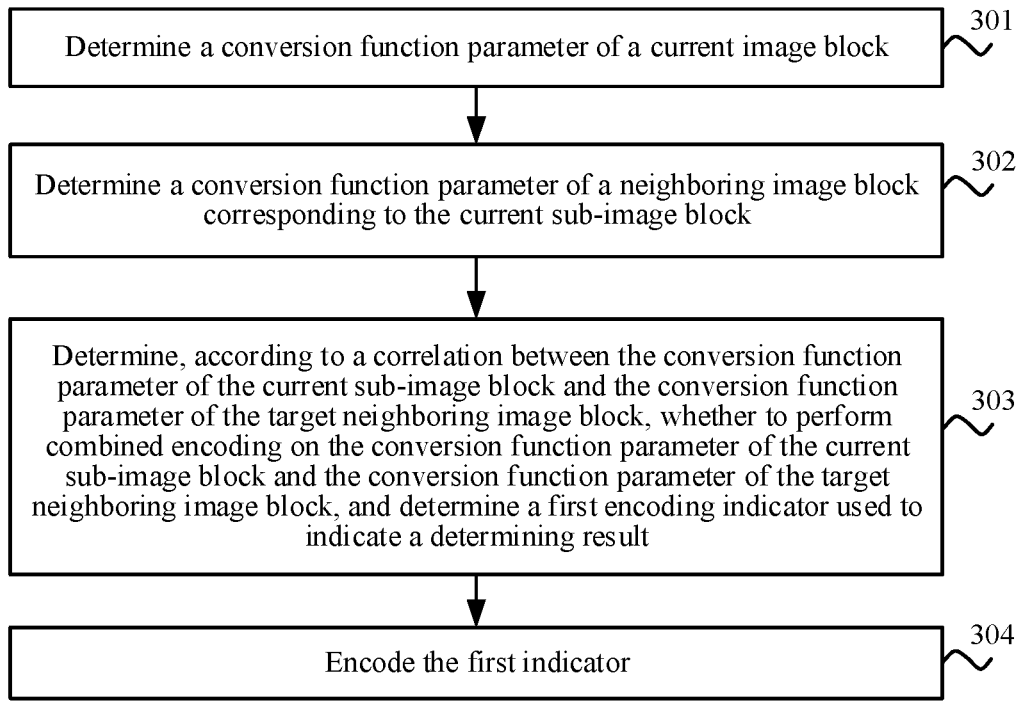
FIG. 3 is a structural block diagram of an image encoding method according to an embodiment of the present disclosure.

FIG. 3 is a structural block diagram of an image encoding method according to an embodiment of the present disclosure.

301. Determine a conversion function parameter of a current image block.

302. Determine a conversion function parameter of a neighboring image block corresponding to the current image block.

303. Determine, according to a correlation between the conversion function parameter of the current image block and the conversion function parameter of the neighboring image block, whether to perform merge encoding on the conversion function parameter of the current image block and the conversion function parameter of the neighboring image block, and determine a first indicator, where the first indicator is used to indicate whether to perform merge encoding on the conversion function parameter of the current image block and the conversion function parameter of the neighboring image block.

304. Encode the first indicator.

According to the method shown in FIG. 3, merge encoding is performed on the conversion function parameters of the current image block and the neighboring image block, so that bitstream overheads can be reduced, and encoding efficiency can be improved.

The correlation between the conversion function parameter of the current image block and the conversion function parameter of the neighboring image block indicates whether at least one parameter of a conversion function of the current image block is the same as a corresponding parameter of a conversion function of the neighboring image block.

Optionally, in an embodiment, each of the conversion function parameters is M parameters, and M is a positive integer greater than or equal to 1; or each of the conversion function parameters is an index value of a conversion function.

Optionally, in an embodiment, the determining, according to a correlation between the conversion function parameter of the current image block and the conversion function parameter of the neighboring image block, whether to perform merge encoding on the conversion function parameter of the current image block and the conversion function parameter of the neighboring image block includes: if it is determined that the conversion function parameter of the current image block and the conversion function parameter of the neighboring image block are completely the same, determining to perform merge encoding on the conversion function parameter of the current image block and the conversion function parameter of the neighboring image block; or if it is determined that the conversion function parameter of the current image block and the conversion function parameter of the neighboring image block are not completely the same, determining not to perform merge encoding on the conversion function parameter of the current image block and the conversion function parameter of the neighboring image block. When it is determined not to perform merge encoding on the conversion function parameter of the current image block and the conversion function parameter of the neighboring image block, the method further includes: determining first encoding information, where the first encoding information is encoding information for encoding the conversion function parameter of the current image block. It can be understood that after it is determined to perform merge encoding on the conversion function parameter of the current image block and the conversion function parameter of the neighboring image block, a corresponding value of the first indicator may be determined. Similarly, after it is determined not to perform merge encoding on the conversion function parameter of the current image block and the conversion function parameter of the neighboring image block, a corresponding value of the first indicator may be determined.

Optionally, in another embodiment, when each of the conversion function parameters is the M parameters, the determining, according to a correlation between the conversion function parameter of the current image block and the conversion function parameter of the neighboring image block, whether to perform merge encoding on the conversion function parameter of the current image block and the conversion function parameter of the neighboring image block includes: if at least one parameter in the conversion function parameter of the current image block is the same as a corresponding parameter in the conversion function parameter of the neighboring image block, determining to perform merge encoding on the conversion function parameter of the current image block and the conversion function parameter of the neighboring image block; or if no parameter in the conversion function parameter of the current image block is the same as a corresponding parameter in the conversion function parameter of the neighboring image block, determining not to perform merge encoding on the conversion function parameter of the current image block and the conversion function parameter of the neighboring image block. When it is determined not to perform merge encoding on the conversion function parameter of the current image block and the conversion function parameter of the neighboring image block, the method further includes: determining first encoding information, where the first encoding information is encoding information for encoding the conversion function parameter of the current image block. It can be understood that after determining to perform merge encoding on the conversion function parameter of the current image block and the conversion function parameter of the neighboring image block, an encoding device may determine a corresponding value of the first indicator. Similarly, after determining not to perform merge encoding on the conversion function parameter of the current image block and the conversion function parameter of the neighboring image block, the encoding device may determine a corresponding value of the first indicator.

Optionally, in an embodiment, when it is determined to perform merge encoding on the conversion function parameter of the current image block and the conversion function parameter of the neighboring image block, the method further includes: determining M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M; encoding the M encoding flag bits; determining second encoding information, where the second encoding information is encoding information for encoding a parameter in the conversion function parameter of the current image block and a corresponding parameter in the conversion function parameter of the neighboring image block that are different from each other, and the conversion function parameter of the current image block includes a parameter in the conversion function parameter of the current image block that is the same as a corresponding parameter in the conversion function parameter of the neighboring image block, and the parameter in the conversion function parameter of the current image block that is different from the corresponding parameter in the conversion function parameter of the neighboring image block; and encoding the second encoding information.

Optionally, in another embodiment, when it is determined to perform merge encoding on the conversion function parameter of the current image block and the conversion function parameter of the neighboring image block, the method further includes: determining M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, ..., M; and encoding the M encoding flag bits, where the M parameters in the conversion function parameter of the current image block are the same as the M parameters in the conversion function parameter of the neighboring image block.

Further, the determining a conversion function parameter of a neighboring image block corresponding to the current image block includes: determining the neighboring image block in multiple candidate neighboring image blocks and determining the conversion function parameter of the neighboring image block. The method further includes: determining a position of the neighboring image block and determining a second indicator, where the second indicator is used to indicate the position of the neighboring image block; and encoding the second indicator.

Further, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

In an optional embodiment of the present disclosure, the determining whether to perform merge encoding on the conversion function parameter of the current image block and the conversion function parameter of the neighboring image block and determining a first indicator may alternatively be implemented by using the following method:

obtaining the conversion function parameter of the neighboring image block neighboring the current image block;

determining a luminance correlation or a texture correlation between the neighboring image block and the current image block; and determining, according to the luminance correlation or the texture correlation, whether to perform merge encoding on the conversion function parameter of the current image block and the conversion function parameter of the neighboring image block and determining the indicator.

A corresponding decoding end may determine, according to only the luminance correlation, the conversion function parameter corresponding to the current image block in the conversion function parameter of the neighboring block, and the encoding end does not need to generate the first indicator.

Figure 4:
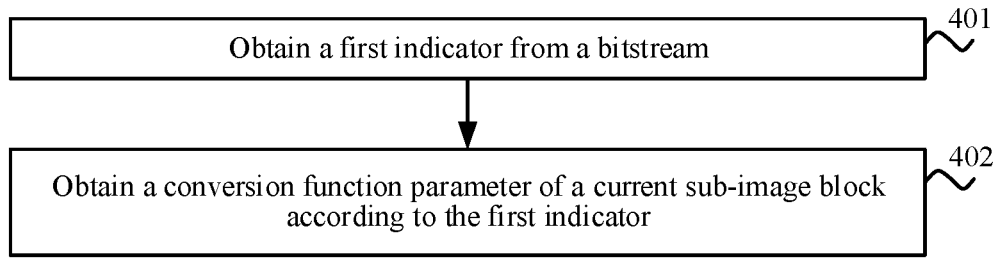
FIG. 4 is a schematic flowchart of an image decoding method according to an embodiment of the present disclosure.

FIG. 4 is a schematic flowchart of an image decoding method according to an embodiment of the present disclosure.

401. Obtain a first indicator from a bitstream, where the first indicator is used to indicate whether to perform combined decoding on a conversion function parameter of a current image block and a conversion function parameter of a neighboring image block.

402. Obtain the conversion function parameter of the current image block according to the first indicator.

According to the method shown in FIG. 4, the conversion function parameters of the current image block and the neighboring image block on which combined decoding needs to be performed may be decoded, so that bitstream overheads can be reduced, and decoding efficiency can be improved.

Optionally, in an embodiment, each of the conversion function parameters is M parameters, and M is a positive integer greater than or equal to 1; or each of the conversion function parameters is an index value of a conversion function.

Optionally, in an embodiment, the obtaining the conversion function parameter of the current image block according to the first indicator includes: when it is determined that the first indicator is used to instruct to perform combined decoding on the conversion function parameter of the current image block and the conversion function parameter of the neighboring image block, determining that the conversion function parameter of the current image block is the same as the conversion function parameter of the neighboring image block.

Optionally, in another embodiment, the obtaining the conversion function parameter of the current image block according to the first indicator includes: when it is determined that the first indicator is used to instruct to perform combined decoding on the conversion function parameter of the current image block and the conversion function parameter of the neighboring image block, obtaining M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, ..., M; determining, according to the M decoding flag bits, a parameter in the conversion function parameter of the current image block and a corresponding parameter in the conversion function parameter of the neighboring image block that are the same; obtaining second decoding information, where the second decoding information is decoding information for decoding a parameter in the conversion function parameter of the current image block and a corresponding parameter in the conversion function parameter of the neighboring image block that are different from each other, and the conversion function parameter of the current image block includes the parameter in the conversion function parameter of the current image block that is the same as the corresponding parameter in the conversion function parameter of the neighboring image block, and the parameter in the conversion function parameter of the current image block that is different from the corresponding parameter in the conversion function parameter of the neighboring image block; and decoding the second decoding information according to the M decoding flag bits, to determine the parameter in the conversion function parameter of the current image block and the corresponding parameter in the conversion function parameter of the neighboring image block that are different from each other.

Optionally, in another embodiment, the obtaining the conversion function parameter of the current image block according to the first indicator includes: when it is determined that the first indicator is used to instruct to perform combined decoding on the conversion function parameter of the current image block and the conversion function parameter of the neighboring image block, obtaining M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, ..., M; and determining, according to the M decoding flag bits, a parameter in the conversion function parameter of the current image block and a corresponding parameter in the conversion function parameter of the neighboring image block that are the same, where the M parameters in the conversion function parameter of the current image block are the same as the M parameters in the conversion function parameter of the neighboring image block.

Optionally, in another embodiment, the obtaining the conversion function parameter of the current image block according to the first indicator includes: when it is determined that the first indicator is used to instruct not to perform combined decoding on the conversion function parameter of the current image block and the conversion function parameter of the neighboring image block, obtaining first decoding information, where the first decoding information is decoding information for decoding the conversion function parameter of the current image block; and decoding the first decoding information to obtain the conversion function parameter of the current image block.

Further, before the obtaining the conversion function parameter of the current image block according to the first indicator, the method further includes: obtaining a second indicator; and determining the neighboring image block according to the second indicator.

Optionally, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

To help a person skilled in the art better understand the present disclosure, the present disclosure is further described below with reference to specific embodiments. It can be understood that the specific embodiments are merely intended to facilitate better understanding of the present disclosure, rather than limiting the present disclosure.

First, a conversion function and an inverse conversion function are described. In a commonly used HDR encoding scheme, a conversion process in an encoding device and a specific form of a used conversion function PQ_TF are shown in the following formula (1):

$$\begin{cases} R' = \text{PQ\_TF}(\max(0, \min(R/10000, 1))) \\ G' = \text{PQ\_TF}(\max(0, \min(G/10000, 1))), \text{ where} \\ B' = \text{PQ\_TF}(\max(0, \min(B/10000, 1))) \end{cases} \quad (1)$$

$$\text{PQ\_TF}(L) = \left(\frac{c_1 + c_2 L^{m_1}}{1 + c_3 L^{m_1}}\right)^{m_2},$$

$$m_1 = \frac{2610}{4096} \times \frac{1}{4} = 0.1593017578125,$$

$$m_2 = \frac{2523}{4096} \times 128 = 78.84375,$$

$$c_1 = c_3 - c_2 + 1 = \frac{3424}{4096} = 0.8359375,$$

$$c_2 = \frac{2413}{4096} \times 32 = 18.8515625, \text{ and}$$

$$c_3 = \frac{2392}{4096} \times 32 = 18.6875.$$

Correspondingly, a conversion process in a decoding device and a specific form of a used inverse conversion function inverse PQ_TF (which is an inverse function of PQ_TF) are shown in the following formula (2):

$$\begin{cases} R = 10000 * \text{inversePQ\_TF}(R') \\ G = 10000 * \text{inversePQ\_TF}(G'), \text{ where} \\ B = 10000 * \text{inversePQ\_TF}(B') \end{cases} \quad (2)$$

$$\text{inversePQ\_TF}(N) = \left(\frac{\max[(N^{1/m_2} - c_1), 0]}{c_2 - c_3 N^{1/m_2}}\right)^{1/m_1},$$

$$m_1 = \frac{2610}{4096} \times \frac{1}{4} = 0.1593017578125,$$

$$m_2 = \frac{2523}{4096} \times 128 = 78.84375,$$

$$c_1 = c_3 - c_2 + 1 = \frac{3424}{4096} = 0.8359375,$$

$$c_2 = \frac{2413}{4096} \times 32 = 18.8515625, \text{ and}$$

$$c_3 = \frac{2392}{4096} \times 32 = 18.6875.$$

It can be learned that conversion function parameters $m_1$, $m_2$, $c_1$, $c_2$, and $c_3$ are the same as inverse conversion function parameters $m_1$, $m_2$, $c_1$, $c_2$, and $c_3$. That is, forms of functions used by the decoding device and the encoding device are different, but the decoding device may use, as the inverse conversion function parameter, a parameter the same as the conversion function parameter. Therefore, the encoding device may encode the conversion function parameter, and the decoding device may decode an encoding result to obtain the conversion function parameter and use the conversion function parameter as the inverse conversion function parameter.

In addition, in an actual encoding and decoding system, to facilitate implementation of encoding and decoding, the foregoing function forms may exist in a form of a search table. The conversion function parameter (the inverse conversion function parameter) is determined by using the parameter of the conversion function (the inverse conversion function) as an index value. For example, in the function PQ_TF, L is an input variable, $m_1$, $m_2$, $c_1$, $c_2$, and $c_3$ are the parameters of the function. Therefore, a search table with $m_1$, $m_2$, $c_1$, $c_2$, $c_3$, and L as variables may be created, and an output value of the function PQ_TF may be obtained by searching according to values of $m_1$, $m_2$, $c_1$, $c_2$, $c_3$, and L. Considering that L may have a relatively large value range, to reduce a size of the search table, the search table may be set by using a sampled value of L as a variable, to obtain the output value of the function PQ_TF. Similarly, in the function inverse PQ_TF, N is an input variable, $m_1$, $m_2$, $c_1$, $c_2$, and $c_3$ are the parameters of the function. Therefore, a search table with $m_1$, $m_2$, $c_1$, $c_2$, $c_3$, and L as variables may be created, and an output value of the function inverse PQ_TF may be obtained by searching according to values of $m_1$, $m_2$, $c_1$, $c_2$, $c_3$, and N. Considering that N may have a relatively large value range, to reduce a size of the search table, the search table may be set by using a sampled value of N as a variable, to obtain the output value of the function inversePQ_TF.

The encoding device needs to determine a conversion function of the neighboring image block corresponding to the current image block.

Optionally, in an embodiment, a position of the neighboring image block corresponding to the current image block is fixed. In this case, the encoding device may directly determine the conversion function of the neighboring image block at the fixed position. The neighboring image block is a neighboring image block neighboring the current image block in terms of space or time. Assuming that the neighboring image block neighbors the current image block in terms of space, the neighboring image block may be a neighboring image block located at an upper position, an upper left position, a left position, or another position of the current image block. For example, it may be specified that the neighboring image block corresponding to the image block is an image block located at upper left of the current image block. Further, when it is specified that the neighboring image block corresponding to the image block is an image block located at upper left of the current image block, image blocks at some positions (for example, image blocks located on edges) may not have corresponding neighboring image blocks. In this case, it may be specified that the neighboring image blocks corresponding to these sub-images conform to another rule. For example, an image block on the left of the image block is the neighboring image block of the image block. Assuming that the neighboring image block neighbors the current image block in terms of time, if the current image block is an image block in $T^{th}$-frame image blocks, the neighboring image block corresponding to the current image block may be an image block at a specified position of an image block in a neighboring frame.

Optionally, in another embodiment, a position of the neighboring image block corresponding to the current image block may not be fixed. Because the current image block may have multiple neighboring image blocks, one of the neighboring image blocks may be selected as the neighboring image block. The multiple neighboring image blocks neighboring the current image block may be referred to as candidate neighboring image blocks. Optionally, in an embodiment, the encoding device may determine, according to conversion function parameters of the multiple candidate neighboring image blocks, the conversion function parameter of the neighboring image block corresponding to the current image block. The encoding device may compare the conversion function parameters of the multiple candidate neighboring image blocks with the conversion function parameter of the current image block, and determine a candidate neighboring image block having a largest quantity of same parameters as the neighboring image block corresponding to the current image block. Optionally, in another embodiment, the encoding device may randomly select one from the multiple candidate neighboring image blocks as the neighboring image block. When the position of the neighboring image block corresponding to the current image block may not be fixed, the encoding device further needs to determine position information of the neighboring image block and determine a second indicator used to indicate the position information of the neighboring image block, and send the second indicator to the decoding device. The decoding device may determine the position of the neighboring image block according to the second indicator, and determine the conversion function parameter of the current image block with reference to the first indicator. A person skilled in the art may understand that different values of the second indicator may be used to indicate positions of the neighboring image block. For example, if a value of the second indicator is 0, it indicates that the neighboring image block is located on left of the current image block; or if a value of the second indicator is 1, it indicates that the neighboring image block is located at upper of the current image block. A person skilled in the art may understand that if the encoding device determines that there is one candidate neighboring image block in the multiple candidate neighboring image blocks and a conversion function parameter of the candidate neighboring image block and the conversion function parameter of the current image block are completely the same, comparison with a candidate neighboring image block that has not been compared with may be stopped, and the candidate neighboring image block is directly determined as the neighboring image block corresponding to the current image block. A person skilled in the art may also understand that if it is determined that merge encoding can be performed on the conversion function parameter of the current image block and the conversion function parameter of the neighboring image block only when the conversion function parameter of the current image block and the conversion function parameter of the neighboring image block are completely the same, a candidate neighboring image block having a conversion function parameter completely the same as the conversion function parameter of the current image block needs to be determined in the multiple candidate neighboring image blocks. If there is no corresponding candidate neighboring image block in the multiple candidate neighboring image blocks, it may be determined that the neighboring image block is any candidate neighboring image block in the multiple reference images. Alternatively, it may be considered that it has been determined that at least one parameter in the conversion function parameter of the neighboring image block is different from a corresponding parameter in the conversion function parameter of the current image block.

A person skilled in the art may understand that the encoding device and the decoding device need to use a same manner for determining the neighboring image block. For example, if the position of the neighboring image block is fixed, positions of the neighboring image block that are determined by the encoding device and the decoding device are the same. In addition, the decoding device does not need to obtain the second indicator used to indicate the position of the neighboring image block. If the position of the neighboring image block is not fixed, the decoding device needs to decode the second indicator to determine the position of the neighboring image block according to the second indicator.

Optionally, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

After determining the conversion function parameter of the neighboring image block, the encoding device may determine, according to the conversion function parameter of the current image block and the conversion function parameter of the neighboring image block, whether to perform merge encoding on the conversion function parameter of the current image block and the conversion function parameter of the neighboring image block. Correspondingly, the decoding device may obtain the conversion function parameter of the current image block according to the first indicator parameter used to indicate whether to perform merge encoding on the conversion function parameter of the current image block and the conversion function parameter of the neighboring image block.

Optionally, in an embodiment, only when the conversion function parameter of the current image block and the conversion function parameter of the neighboring image block are completely the same, it is determined to perform merge encoding on the conversion function parameter of the current image block and the conversion function parameter of the neighboring image block. For example, if three parameters $C_1$, $C_2$, and $C_3$ in the conversion function parameter of the current image block and three parameters $C_1$, $C_2$, and $C_3$ in the conversion function parameter of the neighboring image block are completely the same, the encoding device determines to perform merge encoding on the current image block and the neighboring image block in terms of the conversion function parameters, determines a corresponding first indicator, and encodes the first indicator. For another example, if the conversion function parameter of the current image block is a parameter group whose index value is 3 and the conversion function parameter of the neighboring image block is also a parameter group whose index value is 3, the encoding device determines to perform merge encoding on the current image block and the neighboring image block, determines a corresponding first indicator, and encodes the first indicator. If it is determined that at least one parameter in the conversion function parameter of the current image block is different from a corresponding parameter in the conversion function parameter of the neighboring image block, it is determined not to perform merge encoding on the conversion function parameter of the current image block and the conversion function parameter of the neighboring image block. For example, if one of the conversion function parameters $C_1$, $C_2$, and $C_3$ of the current image block is different from a corresponding parameter in the conversion function parameter of the neighboring image block, the encoding device determines not to perform merge encoding on the current image block and the neighboring image block, determines a corresponding first indicator, and encodes the first indicator. When determining not to perform merge encoding on the current image block and the neighboring image block, the encoding device further needs to determine first encoding information. The first encoding information is encoding information for encoding the conversion function parameter of the current image block. After determining whether to perform merge encoding on the conversion function parameter of the current image block and the conversion function parameter of the neighboring image block, the encoding device may determine the first indicator according to a determining result and encode the first indicator. For example, when a value of the first indicator is 1, it may indicate that merge encoding is to be performed on the conversion function parameter of the current image block and the conversion function parameter of the neighboring image block; or when a value of the first indicator is 0, it may indicate that merge encoding is not to be performed on the conversion function parameter of the current image block and the conversion function parameter of the neighboring image block.

After obtaining the first indicator, the decoding device may obtain the conversion function parameter of the current image block according to the first indicator. Specifically, the decoding device decodes the encoded first indicator to determine the value of the first indicator, and determines, according to the value of the first indicator, whether to perform combined decoding on the conversion function parameter of the current image block and the conversion function parameter of the neighboring image block. For example, when determining that the first indicator is 1 (that is, it indicates that combined decoding is to be performed on the conversion function parameter of the current image block and the conversion function parameter of the neighboring image block), the decoding device determines that all parameters in the conversion function parameter of the current image block and all parameters in the conversion function parameter of the neighboring image block are completely the same. When determining that the first indicator is 0 (that is, it indicates that combined decoding is not to be performed on the conversion function parameter of the current image block and the conversion function parameter of the neighboring image block), the decoding device obtains first decoding information and decodes the first decoding information. The first decoding information is decoding information for decoding the conversion function parameter of the current image block. The decoding device may obtain the conversion function parameter of the current image block by decoding the first decoding information. It can be learned from the foregoing embodiment that the merge encoding is: if the conversion function parameter of the current image block and the conversion function parameter of the neighboring image block are completely the same, the first indicator may be used to indicate encoding for the current image block, where the first indicator may indicate that the conversion function parameter of the current image block and the conversion function parameter of the neighboring image block are completely the same. If determining, by means of decoding, that the first indicator indicates that the conversion function parameter of the current image block and the conversion function parameter of the neighboring image block are completely the same, the decoding device may determine that the conversion function parameter of the neighboring image block is the conversion function parameter of the current image block. That is, by means of merge encoding, the encoding device may use an indicator to represent information for encoding the conversion function parameter of the current image block, and does not need to separately encode the conversion function parameter of the current image block. Correspondingly, the combined decoding means that the decoding device may decode the indicator, and determine the conversion function parameter of the current image block according to the indicator and the conversion function parameter of the corresponding neighboring image block.

Optionally, in another embodiment, when at least one parameter in the conversion function parameter of the current image block is the same as a corresponding parameter in the conversion function parameter of the neighboring image block, it may be determined to perform merge encoding on the current image block and the neighboring image block. In this case, the encoding device further needs to determine an encoding flag bit. The encoding flag bit is used to indicate whether the conversion function parameter of the current image block and the conversion function parameter of the neighboring image block are the same at corresponding positions. Therefore, a quantity of encoding flag bits is the same as a quantity of conversion function parameters of the current image block (a quantity of conversion function parameters of the neighboring image block). For a parameter in the conversion function parameter of the current image block and a corresponding parameter in the conversion function parameter of the neighboring image block that are different from each other, the encoding device encodes the different parameters. For example, if $C_1$, $C_3$, and $C_5$ in five parameters $C_1$, $C_2$, $C_3$, $C_4$, and $C_5$ in the conversion function parameter of the current image block are the same as $C_1$, $C_3$, and $C_5$ in five parameters $C_1$, $C_2$, $C_3$, $C_4$, and $C_5$ in the conversion function parameter of the neighboring image block, and $C_2$ and $C_4$ in the conversion function parameter of the current image block are different from $C_2$ and $C_4$ in the conversion function parameter of the neighboring image block, it is determined to perform merge encoding on the current image block and the neighboring image block, and five encoding flag bits are determined. The five encoding flag bits correspond one-to-one to the five parameters. The five encoding flag bits are respectively represented by using $n_1$, $n_2$, $n_3$, $n_4$, and $n_5$. $n_1$, $n_2$, $n_3$, $n_4$, and $n_5$ correspond one-to-one to $C_1$, $C_2$, $C_3$, $C_4$, and $C_5$. If a value of an encoding flag bit is 1, it indicates that the conversion function parameter of the current image block is the same as the conversion function parameter of the neighboring image block at corresponding positions; or if a value of an encoding flag bit is 0, it indicates that the conversion function parameter of the current image block is different from the conversion function parameter of the neighboring image block at corresponding positions. Values of $n_1$, $n_2$, $n_3$, $n_4$, and $n_5$ in this example are respectively 1, 0, 1, 0, and 1. The encoding device may encode the first indicator and the encoding flag bits according to a determining result. In addition, in this example, the encoding device further needs to determine second encoding information. The second encoding information is encoding information for encoding the parameter in the conversion function parameter of the current image block and the corresponding parameter in the conversion function parameter of the neighboring image block that are different from each other. In this example, the encoding device needs to encode conversion function parameters $C_2$ and $C_4$. If determining that no parameter in the conversion function parameter of the current image block is the same as a corresponding parameter in the conversion function parameter of the neighboring image block, the encoding device may determine not to perform merge encoding on the conversion function parameter of the current image block and the conversion function parameter of the neighboring image block, determine a corresponding first indicator, and encode the first indicator. In this case, the encoding device further needs to determine first encoding information. The first encoding information is encoding information for encoding the conversion function parameter of the current image block. For example, when a value of the first indicator is 1, it may indicate that merge encoding is to be performed on the conversion function parameter of the current image block and the conversion function parameter of the neighboring image block; or when a value of the first indicator is 0, it may indicate that merge encoding is not to be performed on the conversion function parameter of the current image block and the conversion function parameter of the neighboring image block.

After obtaining the first indicator, the decoding device may obtain the conversion function parameter of the current image block according to the first indicator. Specifically, the decoding device decodes the encoded first indicator to determine the value of the first indicator, and determines, according to the value of the first indicator, whether to perform combined decoding on the conversion function parameter of the current image block and the conversion function parameter of the neighboring image block. For example, when determining that the first indicator is 1 (that is, it indicates that combined decoding is to be performed on the conversion function parameter of the current image block and the conversion function parameter of the neighboring image block), the decoding device may determine to perform combined decoding on the conversion function parameter of the current image block and the conversion function parameter of the neighboring image block. In this case, the decoding device further decodes an encoded decoding flag bit to obtain a decoding flag bit. The decoding device further needs to decode the second decoding information to obtain the parameter in the conversion function parameter of the current image block and the corresponding parameter in the conversion function parameter of the neighboring image block that are different from each other. The decoding device determines, according to values of decoding flag bits, which parameters in the conversion function parameter of the current image block are the same as parameters in the conversion function parameter of the neighboring image block. In this example, the decoding device may determine that the values of $n_1$, $n_2$, $n_3$, $n_4$, and $n_5$ are respectively 1, 0, 1, 0, and 1. Therefore, the decoding device may determine that $C_1$, $C_3$, and $C_5$ in the five parameters $C_1$, $C_2$, $C_3$, $C_4$, and $C_5$ of the current image block are the same as $C_1$, $C_3$, and $C_5$ in the five parameters $C_1$, $C_2$, $C_3$, $C_4$, and $C_5$ in the conversion function parameter of the neighboring image block, and determine that $C_2$ and $C_4$ in the conversion function parameter of the current image block are different from $C_2$ and $C_4$ in the conversion function parameter of the neighboring image block. After decoding the second decoding information, the decoding device obtains $C_2$ and $C_4$ in the conversion function parameter of the current image block. When the value of the first indicator is 0, it may indicate that combined decoding is not to be performed on the conversion function parameter of the current image block and the conversion function parameter of the neighboring image block. When determining that the first indicator is 0 (that is, it indicates that combined decoding is not to be performed on the conversion function parameter of the current image block and the conversion function parameter of the neighboring image block), the decoding device may determine not to perform combined decoding on the conversion function parameter of the current image block and the conversion function parameter of the neighboring image block. In this case, the decoding device obtains first decoding information. The first decoding information is decoding information for decoding the conversion function parameter of the current image block. The decoding device decodes the first decoding information to obtain the conversion function parameter of the current image block. A person skilled in the art may understand that the conversion function parameter determined by the decoding device is the conversion function parameter. It can be learned from the foregoing embodiment that the merge encoding is: if at least one parameter in the conversion function parameter of the current image block is the same as a corresponding parameter in the conversion function parameter of the neighboring image block, encoding flag bits are used to indicate the same parameters and different parameters, and only the different parameters may be encoded in an encoding process. That is, by means of merge encoding, the encoding device may use the encoding flag bit to represent information for encoding some parameters in the conversion function parameter of the current image block (that is, information for encoding the parameter in the conversion function parameter of the current image block and the corresponding parameter in the conversion function parameter of the neighboring image block that are the same), and does not need to separately encode these parameters. Correspondingly, the combined decoding means that the decoding device may determine, according to the decoding flag bit and the conversion function parameter of the corresponding neighboring image block, information for decoding the parameter in the conversion function parameter of the current image block and the corresponding parameter in the conversion function of the neighboring image block that are the same. A person skilled in the art may understand that if all parameters in the conversion function parameter of the current image block and all parameters in the conversion function parameter of the neighboring image block are the same, the encoding device does not need to determine the second decoding information. Correspondingly, the decoding device may determine the conversion function parameter of the current image block according to the decoding flag bit and the conversion function parameter of the neighboring image block (that is, the conversion function parameter of the current image block is the same as the conversion function parameter of the neighboring image block).

Optionally, in the conversion function parameter of the current image block, there may be k parameters, and merge encoding is not performed on the k parameters and corresponding conversion function parameters of the neighboring image block. That is, the k parameters are always separately encoded.

A person skilled in the art may understand that encoding by the encoding device corresponds to decoding by the decoding device. For example, for the encoding device, the first indicator is used to indicate whether to perform merge encoding on the conversion function parameter of the current image block and the conversion function parameter of the neighboring image block. After receiving the first indicator, the decoding device may determine that the first indicator is used to indicate whether to perform combined decoding on the conversion function parameter of the current image block and the conversion function parameter of the neighboring image block. For another example, the first encoding information is the first decoding information for the decoding device.

Figure 5:
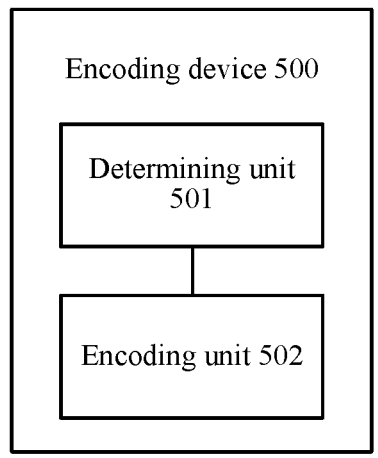
FIG. 5 is a structural block diagram of an encoding device according to an embodiment of the present disclosure.

FIG. 5 is a structural block diagram of an encoding device according to an embodiment of the present disclosure. As shown in FIG. 5, an encoding device 500 includes a determining unit 501 and an encoding unit 502.

The determining unit 501 is configured to determine a conversion function parameter of a current image block.

The determining unit 501 is further configured to determine a conversion function parameter of a neighboring image block corresponding to the current image block.

The determining unit 501 is further configured to: determine, according to a correlation between the conversion function parameter of the current image block and the conversion function parameter of the neighboring image block, whether to perform merge encoding on the conversion function parameter of the current image block and the conversion function parameter of the neighboring image block, and determine a first indicator, where the first indicator is used to indicate whether to perform merge encoding on the conversion function parameter of the current image block and the conversion function parameter of the neighboring image block.

The encoding unit 502 is configured to encode the first indicator.

According to the encoding device 500 shown in FIG. 5, merge encoding is performed on the conversion function parameters of the current image block and the neighboring image block, so that bitstream overheads can be reduced, and encoding efficiency can be improved.

Optionally, each of the conversion function parameters is M parameters, and M is a positive integer greater than or equal to 1; or each of the conversion function parameters is an index value of a conversion function.

Optionally, in an embodiment, the determining unit 501 is specifically configured to: if determining that all parameters in the conversion function parameter of the current image block and all parameters in the conversion function parameter of the neighboring image block are the same, determine to perform merge encoding on the conversion function parameter of the current image block and the conversion function parameter of the neighboring image block; or if determining that at least one parameter in the conversion function parameter of the current image block is different from a corresponding parameter in the conversion function parameter of the neighboring image block, determine not to perform merge encoding on the conversion function parameter of the current image block and the conversion function parameter of the neighboring image block. The encoding unit 502 is further configured to: when the determining unit determines not to perform merge encoding on the conversion function parameter of the current image block and the conversion function parameter of the neighboring image block, determine first encoding information, where the first encoding information is encoding information for encoding the conversion function parameter of the current image block.

Optionally, in another embodiment, when each of the conversion function parameters is the M parameters, the determining unit 501 is specifically configured to: if at least one parameter in the conversion function parameter of the current image block is the same as a corresponding parameter in the conversion function parameter of the neighboring image block, determine to perform merge encoding on the conversion function parameter of the current image block and the conversion function parameter of the neighboring image block; or if no parameter in the conversion function parameter of the current image block is the same as a corresponding parameter in the conversion function parameter of the neighboring image block, determine not to perform merge encoding on the conversion function parameter of the current image block and the conversion function parameter of the neighboring image block. The encoding unit 502 is further configured to: when the determining unit 501 determines not to perform merge encoding on the conversion function parameter of the current image block and the conversion function parameter of the neighboring image block, determine first encoding information, where the first encoding information is encoding information for encoding the conversion function parameter of the current image block.

Optionally, in an embodiment, the determining unit 501 is further configured to determine M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M. The encoding unit 502 is further configured to encode the M encoding flag bits. The determining unit 501 is further configured to determine second encoding information, where the second encoding information is encoding information for encoding a parameter in the conversion function parameter of the current image block and a corresponding parameter in the conversion function parameter of the neighboring image block that are different from each other, and the conversion function parameter of the current image block includes a parameter in the conversion function parameter of the current image block that is the same as a corresponding parameter in the conversion function parameter of the neighboring image block, and the parameter in the conversion function parameter of the current image block that is different from the corresponding parameter in the conversion function parameter of the neighboring image block. The encoding unit 502 is further configured to encode the second encoding information.

Optionally, in another embodiment, the determining unit 501 is further configured to determine M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M. The encoding unit 502 is further configured to encode the M encoding flag bits, where the M parameters in the conversion function parameter of the current image block are the same as the M parameters in the conversion function parameter of the neighboring image block.

Further, the determining unit 501 is further configured to: determine the neighboring image block in multiple candidate neighboring image blocks and determine the conversion function parameter of the neighboring image block; and determine a position of the neighboring image block and determine a second indicator, where the second indicator is used to indicate the position of the neighboring image block. The encoding unit 502 is further configured to encode the second indicator.

Further, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

Figure 6:
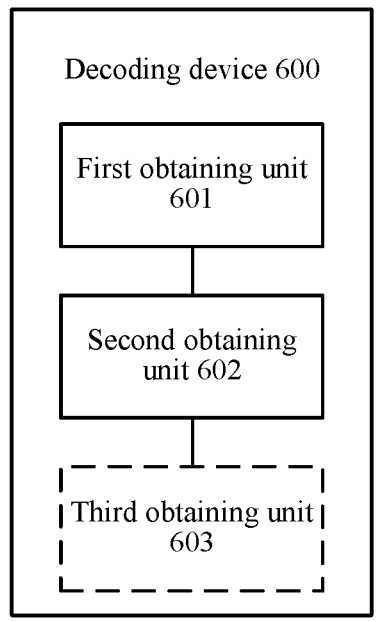
FIG. 6 is a structural block diagram of a decoding device according to an embodiment of the present disclosure.

FIG. 6 is a structural block diagram of a decoding device according to an embodiment of the present disclosure. As shown in FIG. 6, a decoding device 600 includes a first obtaining unit 601 and a second obtaining unit 602.

The first obtaining unit 601 is configured to obtain a first indicator from a bitstream, where the first indicator is used to indicate whether to perform combined decoding on a conversion function parameter of a current image block and a conversion function parameter of a neighboring image block.

The second obtaining unit 602 is configured to obtain the conversion function parameter of the current image block according to the first indicator.

According to the decoding device shown in FIG. 6, the conversion function parameters of the current image block and the neighboring image block on which combined decoding needs to be performed may be decoded, so that bitstream overheads can be reduced, and decoding efficiency can be improved.

Optionally, each of the conversion function parameters is M parameters, and M is a positive integer greater than or equal to 1; or each of the conversion function parameters is an index value of a conversion function.

Optionally, in an embodiment, the second obtaining unit 602 is specifically configured to: when it is determined that the first indicator is used to instruct to perform combined decoding on the conversion function parameter of the current image block and the conversion function parameter of the neighboring image block, determine that the conversion function parameter of the current image block is the same as the conversion function parameter of the neighboring image block.

Optionally, in another embodiment, when each of the conversion function parameters is the M parameters, the second obtaining unit 602 is specifically configured to: when it is determined that the first indicator is used to instruct to perform combined decoding on the conversion function parameter of the current image block and the conversion function parameter of the neighboring image block, obtain M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, . . . , M; determine, according to the M decoding flag bits, a parameter in the conversion function parameter of the current image block and a corresponding parameter in the conversion function parameter of the neighboring image block that are the same; obtain second decoding information, where the second decoding information is decoding information for decoding a parameter in the conversion function parameter of the current image block and a corresponding parameter in the conversion function parameter of the neighboring image block that are different from each other, and the conversion function parameter of the current image block includes the parameter in the conversion function parameter of the current image block that is the same as the corresponding parameter in the conversion function parameter of the neighboring image block, and the parameter in the conversion function parameter of the current image block that is different from the corresponding parameter in the conversion function parameter of the neighboring image block; and decode the second decoding information according to the M decoding flag bits, to determine the parameter in the conversion function parameter of the current image block and the corresponding parameter in the conversion function parameter of the neighboring image block that are different from each other.

Optionally, in another embodiment, when each of the conversion function parameters is the M parameters, the second obtaining unit 602 is specifically configured to: when it is determined that the first indicator is used to instruct to perform combined decoding on the conversion function parameter of the current image block and the conversion function parameter of the neighboring image block, obtain M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, . . . , M; and determine, according to the M decoding flag bits, a parameter in the conversion function parameter of the current image block and a corresponding parameter in the conversion function parameter of the neighboring image block that are the same, where the M parameters in the conversion function parameter of the current image block are the same as the M parameters in the conversion function parameter of the neighboring image block.

Further, the second obtaining unit 602 may further obtain second decoding information, where the second decoding information is decoding information for decoding a parameter in the conversion function parameter of the current image block and a corresponding parameter in the conversion function parameter of the neighboring image block that are different from each other; and decode the second decoding information according to the M decoding flag bits, to determine the parameter in the conversion function parameter of the current image block and the corresponding parameter in the conversion function parameter of the neighboring image block that are different from each other.

Optionally, in another embodiment, the second obtaining unit 602 is specifically configured to: when it is determined that the first indicator is used to instruct not to perform combined decoding on the conversion function parameter of the current image block and the conversion function parameter of the neighboring image block, obtain first decoding information, where the first decoding information is decoding information for decoding the conversion function parameter of the current image block; and decode the first decoding information to obtain the conversion function parameter of the current image block. Further, the device further includes: a third obtaining unit 603, configured to: obtain a second indicator, and determine the neighboring image block according to the second indicator.

Further, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

Figure 7:
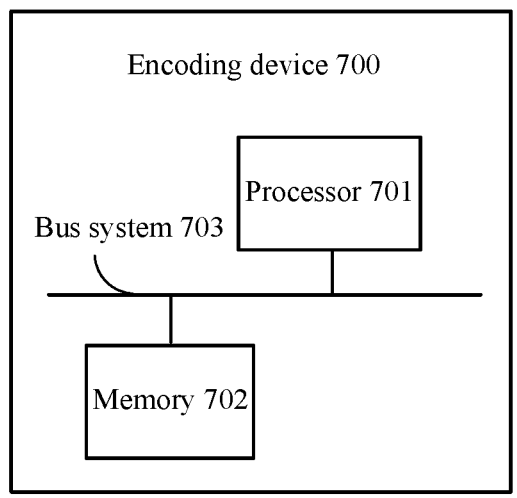
FIG. 7 is a structural block diagram of an encoding device according to an embodiment of the present disclosure.

FIG. 7 is a structural block diagram of an encoding device according to an embodiment of the present disclosure. An encoding device 700 shown in FIG. 7 includes a processor 701 and a memory 702.

Components in the encoding device 700 are coupled by using a bus system 703. The bus system 703 includes a power supply bus, a control bus, and a status signal bus in addition to a data bus. However, for the purpose of clear description, all buses are marked as the bus system 703 in FIG. 7.

The method disclosed in the foregoing embodiment of the present disclosure may be applied to the processor 701, or is implemented by the processor 701. The processor 701 may be an integrated circuit chip with a signal processing capability. During implementation, each step of the foregoing method may be implemented by a hardware integrated logical circuit in the processor 701 or by an instruction in a software form. The processor 701 may be a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logical device, a discrete gate or transistor logic device, or a discrete hardware component. The processor may implement or perform the method, the steps, and the logical block diagram that are disclosed in the embodiment of the present disclosure. The general-purpose processor may be a microprocessor, or the processor may be any conventional processor, or the like. Steps of the method disclosed with reference to the embodiment of the present disclosure may be directly performed and completed by using a hardware decoding processor, or may be performed and completed by using a combination of hardware and software modules in a decoding processor. The software module may be located in a mature storage medium in the art, such as a random access memory (Random Access Memory, RAM), a flash memory, a read-only memory (Read-Only Memory, ROM), a programmable read-only memory or an electrically erasable programmable memory, or a register. The storage medium is located in the memory 702, and the processor 701 reads an instruction in the memory 702, and completes the steps of the method in combination with hardware thereof.

The processor 701 is configured to determine a conversion function parameter of a current image block.

The processor 701 is further configured to determine a conversion function parameter of a neighboring image block corresponding to the current image block.

The processor 701 is further configured to: determine, according to a correlation between the conversion function parameter of the current image block and the conversion function parameter of the neighboring image block, whether to perform merge encoding on the conversion function parameter of the current image block and the conversion function parameter of the neighboring image block, and determine a first indicator, where the first indicator is used to indicate whether to perform merge encoding on the conversion function parameter of the current image block and the conversion function parameter of the neighboring image block.

The processor 701 is configured to encode the first indicator.

According to the encoding device 700 shown in FIG. 7, merge encoding is performed on the conversion function parameters of the current image block and the neighboring image block, so that bitstream overheads can be reduced, and encoding efficiency can be improved.

Optionally, each of the conversion function parameters is M parameters, and M is a positive integer greater than or equal to 1; or each of the conversion function parameters is an index value of a conversion function.

Optionally, in an embodiment, the processor 701 is specifically configured to: if determining that all parameters in the conversion function parameter of the current image block and all parameters in the conversion function parameter of the neighboring image block are the same, determine to perform merge encoding on the conversion function parameter of the current image block and the conversion function parameter of the neighboring image block; or if determining that at least one parameter in the conversion function parameter of the current image block is different from a corresponding parameter in the conversion function parameter of the neighboring image block, determine not to perform merge encoding on the conversion function parameter of the current image block and the conversion function parameter of the neighboring image block. The processor 701 is further configured to: when the it determines not to perform merge encoding on the conversion function parameter of the current image block and the conversion function parameter of the neighboring image block, determine first encoding information, where the first encoding information is encoding information for encoding the conversion function parameter of the current image block.

Optionally, in another embodiment, when each of the conversion function parameters is the M parameters, the processor 701 is specifically configured to: if at least one parameter in the conversion function parameter of the current image block is the same as a corresponding parameter in the conversion function parameter of the neighboring image block, determine to perform merge encoding on the conversion function parameter of the current image block and the conversion function parameter of the neighboring image block; or if no parameter in the conversion function parameter of the current image block is the same as a corresponding parameter in the conversion function parameter of the neighboring image block, determine not to perform merge encoding on the conversion function parameter of the current image block and the conversion function parameter of the neighboring image block. The processor 701 is further configured to: when the processor 701 determines not to perform merge encoding on the conversion function parameter of the current image block and the conversion function parameter of the neighboring image block, determine first encoding information, where the first encoding information is encoding information for encoding the conversion function parameter of the current image block.

Optionally, in an embodiment, the processor 701 is further configured to determine M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M. The processor 701 is further configured to encode the M encoding flag bits. The processor 701 is further configured to determine second encoding information, where the second encoding information is encoding information for encoding a parameter in the conversion function parameter of the current image block and a corresponding parameter in the conversion function parameter of the neighboring image block that are different from each other, and the conversion function parameter of the current image block includes a parameter in the conversion function parameter of the current image block that is the same as a corresponding parameter in the conversion function parameter of the neighboring image block, and the parameter in the conversion function parameter of the current image block that is different from the corresponding parameter in the conversion function parameter of the neighboring image block. The processor 701 is further configured to encode the second encoding information.

Optionally, in another embodiment, the processor 701 is further configured to determine M encoding flag bits, where the M encoding flag bits correspond one-to-one to the M parameters, an $m^{th}$ encoding flag bit in the M encoding flag bits is used to indicate whether an $m^{th}$ parameter in the conversion function parameter of the current image block is the same as an $m^{th}$ parameter in the conversion function parameter of the neighboring image block, and m is 1, . . . , M. The processor 701 is further configured to encode the M encoding flag bits, where the M parameters in the conversion function parameter of the current image block are the same as the M parameters in the conversion function parameter of the neighboring image block.

Further, the processor 701 is further configured to: determine the neighboring image block in multiple candidate neighboring image blocks and determine the conversion function parameter of the neighboring image block; and determine a position of the neighboring image block and determine a second indicator, where the second indicator is used to indicate the position of the neighboring image block. The processor 701 is further configured to encode the second indicator.

Further, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

Figure 8:
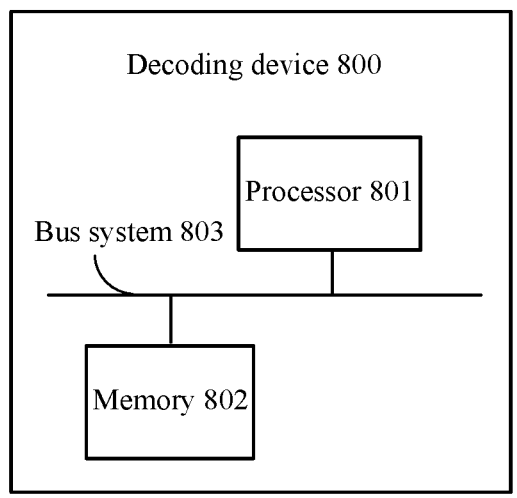
FIG. 8 is a structural block diagram of a decoding device according to an embodiment of the present disclosure.

FIG. 8 is a structural block diagram of a decoding device according to an embodiment of the present disclosure. A decoding device 800 shown in FIG. 8 includes a processor 801 and a memory 802.

Components in the decoding device 800 are coupled by using a bus system 803. The bus system 803 includes a power supply bus, a control bus, and a status signal bus in addition to a data bus. However, for the purpose of clear description, all buses are marked as the bus system 803 in FIG. 8.

The method disclosed in the foregoing embodiment of the present disclosure may be applied to the processor 801, or is implemented by the processor 801. The processor 801 may be an integrated circuit chip with a signal processing capability. During implementation, each step of the foregoing method may be implemented by a hardware integrated logical circuit in the processor 801 or by an instruction in a software form. The processor 801 may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or transistor logic device, or a discrete hardware component. The processor may implement or perform the method, the steps, and the logical block diagram that are disclosed in the embodiment of the present disclosure. The general-purpose processor may be a microprocessor, or the processor may be any conventional processor, or the like. Steps of the method disclosed with reference to the embodiment of the present disclosure may be directly performed and completed by using a hardware decoding processor, or may be performed and completed by using a combination of hardware and software modules in a decoding processor. The software module may be located in a mature storage medium in the art, such as a random access memory (Random Access Memory, RAM), a flash memory, a read-only memory (Read-Only Memory, ROM), a programmable read-only memory or an electrically erasable programmable memory, or a register. The storage medium is located in the memory 802, and the processor 801 reads an instruction in the memory 802, and completes the steps of the method in combination with hardware thereof.

The processor 801 is configured to obtain a first indicator from a bitstream, where the first indicator is used to indicate whether to perform combined decoding on a conversion function parameter of a current image block and a conversion function parameter of a neighboring image block.

The processor 801 is configured to obtain the conversion function parameter of the current image block according to the first indicator.

According to the decoding device shown in FIG. 8, the conversion function parameters of the current image block and the neighboring image block on which combined decoding needs to be performed may be decoded, so that bitstream overheads can be reduced, and decoding efficiency can be improved.

Optionally, each of the conversion function parameters is M parameters, and M is a positive integer greater than or equal to 1; or each of the conversion function parameters is an index value of a conversion function.

Optionally, in an embodiment, the processor 801 is specifically configured to: when determining that the first indicator is used to instruct to perform combined decoding on the conversion function parameter of the current image block and the conversion function parameter of the neighboring image block, determine that the conversion function parameter of the current image block is the same as the conversion function parameter of the neighboring image block.

Optionally, in another embodiment, when each of the conversion function parameters is the M parameters, the processor 801 is specifically configured to: when determining that the first indicator is used to instruct to perform combined decoding on the conversion function parameter of the current image block and the conversion function parameter of the neighboring image block, obtain M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, . . . , M; determine, according to the M decoding flag bits, a parameter in the conversion function parameter of the current image block and a corresponding parameter in the conversion function parameter of the neighboring image block that are the same; obtain second decoding information, where the second decoding information is decoding information for decoding a parameter in the conversion function parameter of the current image block and a corresponding parameter in the conversion function parameter of the neighboring image block that are different from each other, and the conversion function parameter of the current image block includes the parameter in the conversion function parameter of the current image block that is the same as the corresponding parameter in the conversion function parameter of the neighboring image block, and the parameter in the conversion function parameter of the current image block that is different from the corresponding parameter in the conversion function parameter of the neighboring image block; and decode the second decoding information according to the M decoding flag bits, to determine the parameter in the conversion function parameter of the current image block and the corresponding parameter in the conversion function parameter of the neighboring image block that are different from each other.

Optionally, in another embodiment, when each of the conversion function parameters is the M parameters, the processor 801 is specifically configured to: when determining that the first indicator is used to instruct to perform combined decoding on the conversion function parameter of the current image block and the conversion function parameter of the neighboring image block, obtain M decoding flag bits, where the M decoding flag bits correspond one-to-one to the M parameters, an $m^{th}$ decoding flag bit in the M decoding flag bits is used to indicate whether an $m^{th}$ parameter in the conversion function parameter of the current image block is the same as an $m^{th}$ parameter in the conversion function parameter of the neighboring image block, and m is 1, . . . , M; and determine, according to the M decoding flag bits, a parameter in the conversion function parameter of the current image block and a corresponding parameter in the conversion function parameter of the neighboring image block that are the same, where the M parameters in the conversion function parameter of the current image block are the same as the M parameters in the conversion function parameter of the neighboring image block.

Optionally, in another embodiment, the processor 801 is specifically configured to: when determining that the first indicator is used to instruct not to perform combined decoding on the conversion function parameter of the current image block and the conversion function parameter of the neighboring image block, obtain first decoding information, where the first decoding information is decoding information for decoding the conversion function parameter of the current image block; and decode the first decoding information to obtain the conversion function parameter of the current image block. Further, the device further includes: the processor 801, configured to: obtain a second indicator, and determine the neighboring image block according to the second indicator.

Further, the neighboring image block is any one or more of the following neighboring image blocks of the current image block: a left neighboring image block, an upper neighboring image block, an upper left neighboring image block, an upper right neighboring image block, a lower left neighboring image block, or a time-domain neighboring image block.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image decoding method, wherein the method comprises:
    obtaining a first indicator from a bitstream, wherein the first indicator indicates whether to perform combined decoding on a conversion function parameter of a current image block and a conversion function parameter of a neighboring image block, and wherein the conversion function is a function that is used for nonlinear conversion or tone-mapping; and
    obtaining the conversion function parameter of the current image block according to the first indicator.

2. The method according to claim 1, wherein the conversion function parameter of the current image block and the conversion function parameter of the neighboring image block each includes M parameters, M being a positive integer greater than or equal to 1; or
    the conversion function parameter of the current image block and the conversion function parameter of the neighboring image block each is an index value of a conversion function.

3. The method according to claim 1, wherein obtaining the conversion function parameter of the current image block according to the first indicator comprises:
    when it is determined that the first indicator instructs to perform combined decoding on the conversion function parameter of the current image block and the conversion function parameter of the neighboring image block, determining that the conversion function parameter of the current image block is the same as the conversion function parameter of the neighboring image block.

4. The method according to claim 2, wherein when each of the conversion function parameters includes the M parameters, the obtaining the conversion function parameter of the current image block according to the first indicator comprises:
    when it is determined that the first indicator is configured for instructing to perform combined decoding on the conversion function parameter of the current image block and the conversion function parameter of the neighboring image block, obtaining M decoding flag bits, wherein the M decoding flag bits correspond one-to-one to the M parameters, wherein an $m^{th}$ decoding flag bit in the M decoding flag bits indicates whether an $m^{th}$ parameter in the conversion function parameter of the current image block is the same as an $m^{th}$ parameter in the conversion function parameter of the neighboring image block, m being an integer between 1 and M;
    determining, according to the M decoding flag bits, a parameter in the conversion function parameter of the current image block and a corresponding parameter in the conversion function parameter of the neighboring image block that are the same;
    obtaining second decoding information, wherein the second decoding information is decoding information for decoding a parameter in the conversion function parameter of the current image block and a corresponding parameter in the conversion function parameter of the neighboring image block that are different from each other; and
    decoding the second decoding information according to the M decoding flag bits, to determine the parameter in the conversion function parameter of the current image block and the corresponding parameter in the conversion function parameter of the neighboring image block that are different from each other, wherein the conversion function parameter of the current image block comprises the parameter in the conversion function parameter of the current image block that is the same as the corresponding parameter in the conversion function parameter of the neighboring image block, and a parameter in the conversion function parameter of the current image block that is different from the corresponding parameter in the conversion function parameter of the neighboring image block.

5. The method according to claim 2, wherein when each of the conversion function parameters includes the M parameters, the obtaining the conversion function parameter of the current image block according to the first indicator comprises:
    when it is determined that the first indicator is configured for instructing to perform combined decoding on the conversion function parameter of the current image block and the conversion function parameter of the neighboring image block, obtaining M decoding flag bits, wherein the M decoding flag bits correspond one-to-one to the M parameters, wherein an $m^{th}$ decoding flag bit in the M decoding flag bits indicates whether an $m^{th}$ parameter in the conversion function parameter of the current image block is the same as an $m^{th}$ parameter in the conversion function parameter of the neighboring image block, m being an integer between 1 and M; and
    determining, according to the M decoding flag bits, a parameter in the conversion function parameter of the current image block and a corresponding parameter in the conversion function parameter of the neighboring image block that are the same, wherein the M parameters in the conversion function parameter of the current image block are the same as the M parameters in the conversion function parameter of the neighboring image block.

6. The method according to claim 1, wherein the obtaining the conversion function parameter of the current image block according to the first indicator comprises:
    when it is determined that the first indicator is configured for instructing not to perform combined decoding on the conversion function parameter of the current image block and the conversion function parameter of the neighboring image block, obtaining first decoding information, wherein the first decoding information is decoding information for decoding the conversion function parameter of the current image block; and decoding the first decoding information to obtain the conversion function parameter of the current image block.

7. The method according to claim 1, wherein before the obtaining the conversion function parameter of the current image block according to the first indicator, the method further comprises:

obtaining a second indicator; and determining the neighboring image block according to the second indicator.

8. An encoding device, wherein the device comprises:
a processor and a memory coupled to the processor; and
the processor is configured to:

determine a conversion function parameter of a current image block, wherein determine a conversion function parameter of a neighboring image block corresponding to the current image block, wherein the conversion function is a function that is used for nonlinear conversion or tone-mapping; and determine, according to a correlation between the conversion function parameter of the current image block and the conversion function parameter of the neighboring image block, whether to perform merge encoding on the conversion function parameter of the current image block and the conversion function parameter of the neighboring image block, and determine a first indicator, wherein the first indicator indicates whether to perform merge encoding on the conversion function parameter of the current image block and the conversion function parameter of the neighboring image block; and encode the first indicator.

9. The device according to claim 8, wherein the conversion function parameter of the current image block and the conversion function parameter of the neighboring image block each includes M parameters, M being a positive integer greater than or equal to 1; or the conversion function parameter of the current image block and the conversion function parameter of the neighboring image block each is an index value of a conversion function.

10. The device according to claim 8, wherein the processor is configured to:

if determining that all parameters in the conversion function parameter of the current image block and all parameters in the conversion function parameter of the neighboring image block are the same, determine to perform merge encoding on the conversion function parameter of the current image block and the conversion function parameter of the neighboring image block; and if determining that at least one parameter in the conversion function parameter of the current image block is different from a corresponding parameter in the conversion function parameter of the neighboring image block, determine not to perform merge encoding on the conversion function parameter of the current image block and the conversion function parameter of the neighboring image block; and, wherein when it is determined not to perform merge encoding on the conversion function parameter of the current image block and the conversion function parameter of the neighboring image block, the processor is further configured to determine first encoding information, wherein the first encoding information is encoding information for encoding the conversion function parameter of the current image block.

11. The device according to claim 9, wherein when each of the conversion function parameters includes the M parameters, the processor is configured to:

if at least one parameter in the conversion function parameter of the current image block is the same as a corresponding parameter in the conversion function parameter of the neighboring image block, determine to perform merge encoding on the conversion function parameter of the current image block and the conversion function parameter of the neighboring image block; and if no parameter in the conversion function parameter of the current image block is the same as a corresponding parameter in the conversion function parameter of the neighboring image block, determine not to perform merge encoding on the conversion function parameter of the current image block and the conversion function parameter of the neighboring image block; and, wherein when it is determined not to perform merge encoding on the conversion function parameter of the current image block and the conversion function parameter of the neighboring image block, determine first encoding information, wherein the first encoding information is encoding information for encoding the conversion function parameter of the current image block.

12. The device according to claim 11, wherein the processor is further configured to determine M encoding flag bits, wherein the M encoding flag bits correspond one-to-one to the M parameters, wherein an $m^{th}$ encoding flag bit in the M encoding flag bits indicates whether an $m^{th}$ parameter in the conversion function parameter of the current image block is the same as an $m^{th}$ parameter in the conversion function parameter of the neighboring image block, m being an integer between 1 and M; and wherein the processor is further configured to encode the M encoding flag bits;

determine second encoding information, wherein the second encoding information is encoding information for encoding a parameter in the conversion function parameter of the current image block and a corresponding parameter in the conversion function parameter of the neighboring image block that are different from each other, and the conversion function parameter of the current image block comprises a parameter in the conversion function parameter of the current image block that is the same as a corresponding parameter in the conversion function parameter of the neighboring image block, and a parameter in the conversion function parameter of the current image block that is different from the corresponding parameter in the conversion function parameter of the neighboring image block; and encode the second encoding information.

13. The device according to claim 11, wherein the processor is further configured to determine M encoding flag bits, wherein the M encoding flag bits correspond one-to-one to the M parameters, wherein an $m^{th}$ encoding flag bit in the M encoding flag bits indicates whether an $m^{th}$ parameter in the conversion function parameter of the current image block is the same as an $m^{th}$ parameter in the conversion function parameter of the neighboring image block, m being an integer between 1 and M; and encode the M encoding flag bits, wherein the M parameters in the conversion function parameter of the current image block are the same as the M parameters in the conversion function parameter of the neighboring image block.

14. A decoding device, wherein the device comprises:
a processor and a memory coupled with the processor; and
the processor is configured to:
obtain a first indicator from a bitstream, wherein the first indicator indicates whether to perform combined decoding on a conversion function parameter of a current image block and a conversion function parameter of a neighboring image block, and wherein the conversion function is a function that is used for nonlinear conversion or tone-mapping; and
obtain the conversion function parameter of the current image block according to the first indicator.

15. The device according to claim 14, wherein the conversion function parameter of the current image block and the conversion function parameter of the neighboring image block each includes M parameters, M being a positive integer greater than or equal to 1; or
the conversion function parameter of the current image block and the conversion function parameter of the neighboring image block each is an index value of a conversion function.

16. The device according to claim 14, wherein the processor is configured to: when it is determined that the first indicator is configured for instructing to perform combined decoding on the conversion function parameter of the current image block and the conversion function parameter of the neighboring image block, determine that the conversion function parameter of the current image block is the same as the conversion function parameter of the neighboring image block.

17. The device according to claim 15, wherein when each of the conversion function parameters includes the M parameters, the processor is configured to:
when it is determined that the first indicator is configured for instructing to perform combined decoding on the conversion function parameter of the current image block and the conversion function parameter of the neighboring image block, obtain M decoding flag bits, wherein the M decoding flag bits correspond one-to-one to the M parameters, wherein an $m^{th}$ decoding flag bit in the M decoding flag bits indicates whether an $m^{th}$ parameter in the conversion function parameter of the current image block is the same as an $m^{th}$ parameter in the conversion function parameter of the neighboring image block, m being an integer between 1 and M;
determine, according to the M decoding flag bits, a parameter in the conversion function parameter of the current image block and a corresponding parameter in the conversion function parameter of the neighboring image block that are the same;
obtain second decoding information, wherein the second decoding information is decoding information for decoding a parameter in the conversion function parameter of the current image block and a corresponding parameter in the conversion function parameter of the neighboring image block that are different from each other, and the conversion function parameter of the current image block comprises the parameter in the conversion function parameter of the current image block that is the same as the corresponding parameter in the conversion function parameter of the neighboring image block, and a parameter in the conversion function parameter of the current image block that is different from the corresponding parameter in the conversion function parameter of the neighboring image block; and
decode the second decoding information according to the M decoding flag bits, to determine the parameter in the conversion function parameter of the current image block and the corresponding parameter in the conversion function parameter of the neighboring image block that are different from each other.

18. The device according to claim 15, wherein when each of the conversion function parameters includes the M parameters, the processor is configured to: when it is determined that the first indicator is configured for instructing to perform combined decoding on the conversion function parameter of the current image block and the conversion function parameter of the neighboring image block, obtain M decoding flag bits, wherein the M decoding flag bits correspond one-to-one to the M parameters, wherein an $m^{th}$ decoding flag bit in the M decoding flag bits indicates whether an $m^{th}$ parameter in the conversion function parameter of the current image block is the same as an $m^{th}$ parameter in the conversion function parameter of the neighboring image block, m being an integer between 1 and M; and
determine, according to the M decoding flag bits, a parameter in the conversion function parameter of the current image block and a corresponding parameter in the conversion function parameter of the neighboring image block that are the same, wherein the M parameters in the conversion function parameter of the current image block are the same as the M parameters in the conversion function parameter of the neighboring image block.

19. The device according to claim 14, wherein the processor is configured to: when it is determined that the first indicator is configured for instructing not to perform combined decoding on the conversion function parameter of the current image block and the conversion function parameter of the neighboring image block, obtain first decoding information, wherein the first decoding information is decoding information for decoding the conversion function parameter of the current image block; and
decode the first decoding information to obtain the conversion function parameter of the current image block.

20. The device according to claim 14, wherein the processor is further configured to:
obtain a second indicator, and determine the neighboring image block according to the second indicator.

* * * * *